US012671360B2

(12) United States Patent
Zhu

(10) Patent No.: US 12,671,360 B2
(45) Date of Patent: Jun. 30, 2026

(54) SOLAR RAIL MOUNTING SYSTEM

(71) Applicant: Top Rack Technology, Inc.,
Moorestown, NJ (US)

(72) Inventor: Guohao Zhu, Haining City (CN)

(73) Assignee: TOP RACK TECHNOLOGY, INC.,
Moorestown, NJ (US)

( * ) Notice: Subject to any disclaimer, the term of this
patent is extended or adjusted under 35
U.S.C. 154(b) by 0 days.

(21) Appl. No.: 19/088,415

(22) Filed: Mar. 24, 2025

(65) Prior Publication Data

US 2026/0180496 A1     Jun. 25, 2026

(30) Foreign Application Priority Data

Dec. 19, 2024    (CN) .......................... 202411873956.2

(51) Int. Cl.
H02S 20/30          (2014.01)
H02S 30/10          (2014.01)
F24S 25/60          (2018.01)

(52) U.S. Cl.
CPC ....... H02S 20/30 (2014.12); *F24S 2025/6003*
*(2018.05); F24S 2025/6005 (2018.05); F24S*
*2025/6006 (2018.05); H02S 30/10 (2014.12)*

(58) Field of Classification Search
None
See application file for complete search history.

(56) References Cited

U.S. PATENT DOCUMENTS

| | | | |
|---|---|---|---|
| 11,929,704 B1 * | 3/2024 | Jasmin .................. | F24S 25/00 |
| 12,009,774 B1 * | 6/2024 | Jasmin .................. | H02S 30/00 |
| 2014/0026946 A1 * | 1/2014 | West .................... | F24S 25/632 |
| | | | 136/251 |
| 2015/0034355 A1 * | 2/2015 | Patton .................... | F24S 80/70 |
| | | | 52/60 |
| 2015/0288320 A1 * | 10/2015 | Stearns .................. | F24S 25/60 |
| | | | 52/173.3 |
| 2017/0104442 A1 * | 4/2017 | MacRostie .............. | H02S 20/23 |
| 2017/0279404 A1 * | 9/2017 | Truthseeker ........... | F24S 25/70 |
| 2019/0178274 A1 * | 6/2019 | Katz ........................ | F24S 25/65 |
| 2021/0156413 A1 * | 5/2021 | Stephan ............... | F16B 37/045 |
| 2023/0178904 A1 * | 6/2023 | Stephan .................. | F24S 25/65 |
| | | | 439/115 |
| 2023/0198460 A1 * | 6/2023 | Jasmin .................... | H02S 30/00 |
| | | | 52/90.2 |
| 2023/0396208 A1 * | 12/2023 | Pedlar .................... | H02S 20/23 |

* cited by examiner

*Primary Examiner* — Ryan S Cannon
(74) *Attorney, Agent, or Firm* — FOX ROTHSCHILD
LLP

(57)          ABSTRACT

This present disclosure relates to a solar photovoltaic (PV)
rail mounting system, which includes a mounting base, rails
and rail mounting components, wind deflectors and wind
deflector clamps, grounding wires and grounding wire con-
nectors, inverters and inverter clamps, as well as mid clamps
and end clamps for securing PV panels.
This improvements to the mounting base, mid clamps, and
end clamps enables faster and more convenient installation
of wind deflectors using specialized clamps. They stream-
line the overall installation process, enhancing efficiency
and stability while significantly reducing installation time.

10 Claims, 15 Drawing Sheets

SOLAR RAIL MOUNTING SYSTEM

TECHNICAL FIELD

The present invention relates to the field of solar photovoltaic (PV) mounting systems, specifically to a rail mounting system for solar PV installations, which enhances installation efficiency and stability.

BACKGROUND TECHNOLOGY

Currently, rooftop-mounted PV systems primarily consist of solar panels and mounting structures, with panels secured to rooftops via rail-based mounting systems. The existing installation process typically involves securing a mounting base to the roof, followed by installing rails onto the base. However, this method requires multiple components, including mounting screws, specialized tools, and rail clamps, making installation complex and time-consuming. Additionally, the presence of numerous small parts increases the likelihood of misplacement, further prolonging the installation process.

In existing solar PV mounting structures, mid clamps are used to secure adjacent solar panels, enhancing system stability and wind resistance. Conventional mid clamps typically consist of a connecting block, an upper clamp, and fastening hardware. The upper clamp features pressing plates on both sides, while a fastening bolt passes through the upper clamp to secure it to the connecting block. However, since the upper clamp lacks additional support, it tends to wobble laterally before the bolt is fully tightened, making panel installation difficult and time-consuming. Additionally, if the fastening bolt becomes loose over time, it can cause panel displacement or even detachment, posing safety risks.

Existing end clamps are primarily used to secure PV modules located at the edges of arrays. These clamps must provide wind resistance, tensile strength, and deformation protection. Typically, end clamps are installed outside the rail ends and are secured with bolts. However, since the end clamp and bolt are separate components, installation is cumbersome. Additionally, the exposed end clamps may negatively impact the system's overall aesthetics.

Conventional PV mounting structures mainly consist of a mounting base, rails, mid clamps, and end clamps, with wind deflectors rarely incorporated. In reality, wind deflectors play a crucial role in enhancing wind resistance and protecting the entire solar mounting system. Even when wind deflectors are included, their installation is often simplistic and unreliable, making them prone to detachment under strong wind conditions.

SUMMARY OF THE INVENTION

To address the shortcomings of existing technology, this invention provides an solar PV rail mounting system with enhancements to the mounting base, mid clamps, and end clamps. Additionally, a wind deflector clamp has been introduced for fast and easy installation of wind deflectors, significantly reducing installation time while improving system stability and durability.

To achieve the above objectives, the present invention provides a solar PV rail mounting system, which includes a mounting base, rails and rail mounting components, wind deflectors and wind deflector clamps, grounding wires and grounding wire connectors, inverters and inverter clamps, as well as mid clamps and end clamps.

The mounting base comprises a fixed base (connected to the roof or ground) and a mounting section (connected to the rail clamp). The fixed base includes multiple pre-installed screw sections, arranged around its perimeter, with threading designed to match the installation screws.

The mid clamp consists of an upper pressing block and a fixed connecting block, which are connected using a sleeve-type mechanism. The upper pressing block features a top panel press and two sleeve rods, while the fixed connecting block is designed with matching sleeve slots. A spring-loaded mechanism between the sleeve rods allows for adjustable compression, accommodating height variations during installation. Both the upper pressing block and the fixed connecting block are equipped with grounding pins for enhanced electrical safety.

The end clamp consists of a fixed section, a movable section, and a tension wire. The fixed section features an upper spherical connection slot and a lower rail connection interface, while the movable section includes a frame pressing plate and a spherical protrusion that connects to the spherical slot for flexible adjustments.

The tension wire is fitted with a pull ring, allowing for quick locking via bolt attachment.

The wind deflector clamp consists of an upper wind deflector fixture, a lower wind deflector fixture, and a wind deflector pressing block. One side is fixed to the solar PV panel frame, while the other side is connected to the wind deflector for secure installation. The upper wind deflector fixture includes an installation pressing plate on one side and a guide rail slot on the other, allowing for horizontal adjustment after the wind deflector is snapped into place. The upper and lower fixtures are connected via an adjustable bolt, securing them to the solar panel frame, while the pressing block locks the wind deflector in place.

Further 1. rail clamp consists of a main clamp body and an adjustable section, which includes a movable block, a conical spring, and a flange bolt. A protrusion on the clamp body fits into a positioning groove on the mounting section, ensuring precise alignment during installation.

2. The mounting section is designed in a U-shape, allowing for vertical height adjustment through a U-slot mechanism. A retaining edge prevents bolt slippage, enhancing structural stability.

3. The fixed base is layered with foam rubber, butyl rubber, and release paper, improving vibration absorption and waterproofing.

4. A supporting plate is integrated within the fixed connecting block, preventing vertical displacement of the mid clamp during installation.

5. Dual grounding mechanisms are incorporated:
   Grounding pin I (fixed connecting block) features a press-fit connection for secure grounding to the rail.
   Grounding pin II (upper pressing block) is embedded on both sides of the panel press, ensuring electrical continuity with the module.

6. A curved protrusion is added to the movable section at the bolt connection point, improving structural rigidity.

7. The tension wire is made of soft plastic and features a semi-circular pull hook for easier handling during installation.

8. A secondary spring mechanism is placed between the wind deflector fixtures, providing elasticity for a secure fit.

9. Anti-slip teeth are incorporated into the wind deflector clamp contact points, improving structural stability.

Advantages of the Invention

1. Enhanced Installation Efficiency: The mounting base, mid clamps, and end clamps have been optimized for simplified and rapid installation, while the wind deflector clamp enables quick and secure attachment of wind deflectors.

2. Pre-Assembled Components: The mounting screws and rail clamps are pre-installed on the base, allowing workers to position and secure the base without additional assembly, reducing installation time and complexity.

3. Spring-Loaded Mid Clamps: The sleeve-type connection and internal spring allow for automatic height adjustment, ensuring a secure and stable module installation with enhanced grounding for system reliability.

4. Quick-Locking End Clamps: The three-part end clamp (fixed section, movable section, and tension wire) allows for rapid installation, with a hidden tension wire design for a cleaner and more aesthetic finish.

5. Improved Wind Deflector System: The wind deflector clamp ensures easy installation and firm attachment, with anti-slip teeth for added security, enhancing the overall stability of the solar mounting system.

This invention significantly improves installation efficiency, structural stability, and durability, making it an ideal solution for solar PV rail mounting applications.

DESCRIPTION OF DRAWINGS

FIG. 30: Schematic diagram of the grounding wire at section E in

FIG. 1 of the embodiment of the present invention.

LIST OF COMPONENTS IN THE DRAWINGS

1. Fixed Base
2. Mounting Screw
3. Mounting Section
4. Pre-installed Screw Section
5. Retaining Edge
6. Foam Rubber Layer
7. Base Adhesive Layer
8. Release Paper
9. Rail Clamp
10. Clamp Body
11. Movable Block
12. Conical Spring
13. Flange Bolt
14. Protrusion
15. Groove
16. Spare Screw Installation Hole
17 Upper Pressing Block
18. Fixed Connecting Block
19. Bolt III
20. Upper PV Panel Press
21. Sleeve Rod
22. Rail
23. Grounding Pin I
24. Grounding Pin II
25. Spring I
26. Support Plate
27. Connecting Section 28. Piercing Section
29. Fixed Section
30. Movable Section
31. Tension Wire
32. Bolt IV
33. Spherical Connection Slot
34. Frame Pressing Plate
35. Spherical Protrusion
36. Curved Protrusion
37. Semi-circular Pull Hook
38. Grounding Pin III
39. PV Frame
40. Upper Wind Deflector Fixing Block
41. Lower Wind Deflector Fixing Block
42. Wind Deflector Pressing Block
43. Installation Pressing Plate
44. Strip-shaped Guide Rail Slot
45. Wind Deflector
46. Bolt I
47. Bolt II
48. Spring II
49. Grounding Pin IV
50. Anti-slip Teeth
51. Pressing Strip
52. Rail Connector
53. Rail End Cap
54. Wind Deflector Connector
55. Wind Deflector End Cap
56. Grounding Wire
57 Solar PV Panel Frame

DETAILED DESCRIPTION OF THE
EMBODIMENT

The following section, in conjunction with the accompanying drawings, provides a clear and complete description of the technical solutions of the embodiments of the present invention. It is evident that the described embodiments represent only a portion of the possible implementations of this invention and not all possible embodiments. Based on the disclosed embodiments, any other implementations obtained by those skilled in the field without making creative efforts fall within the scope of the present invention.

Figure 1:
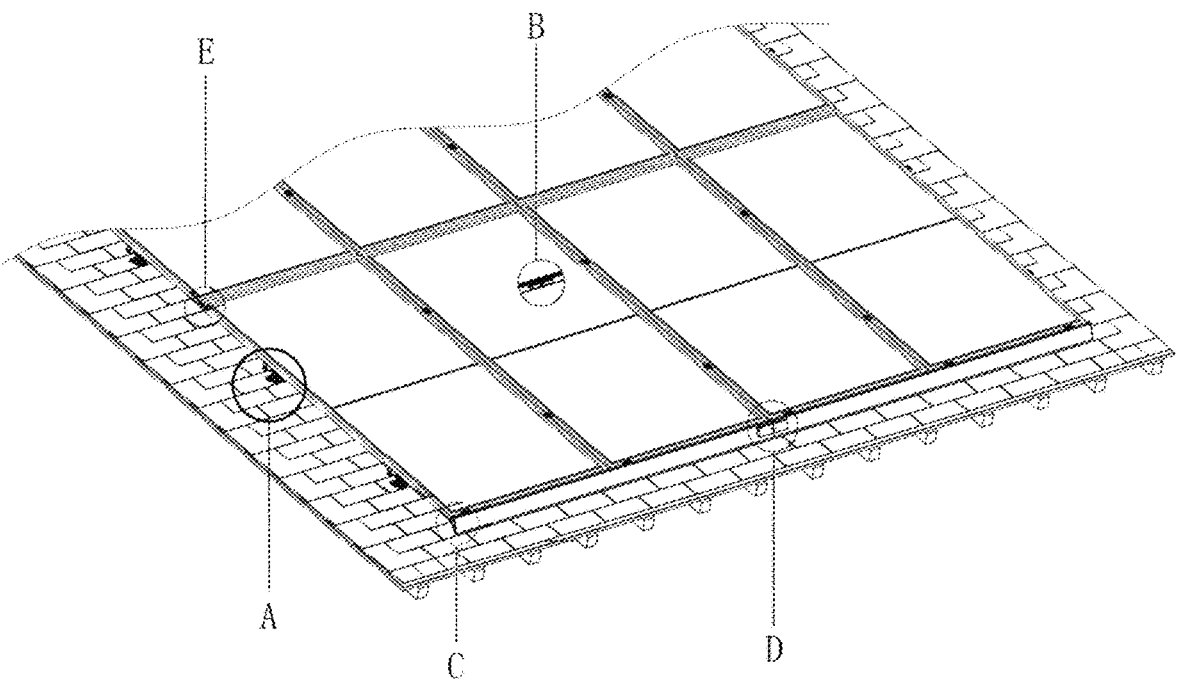
FIG. 1: Schematic diagram of the installed embodiment of the present invention.
Figure 2:
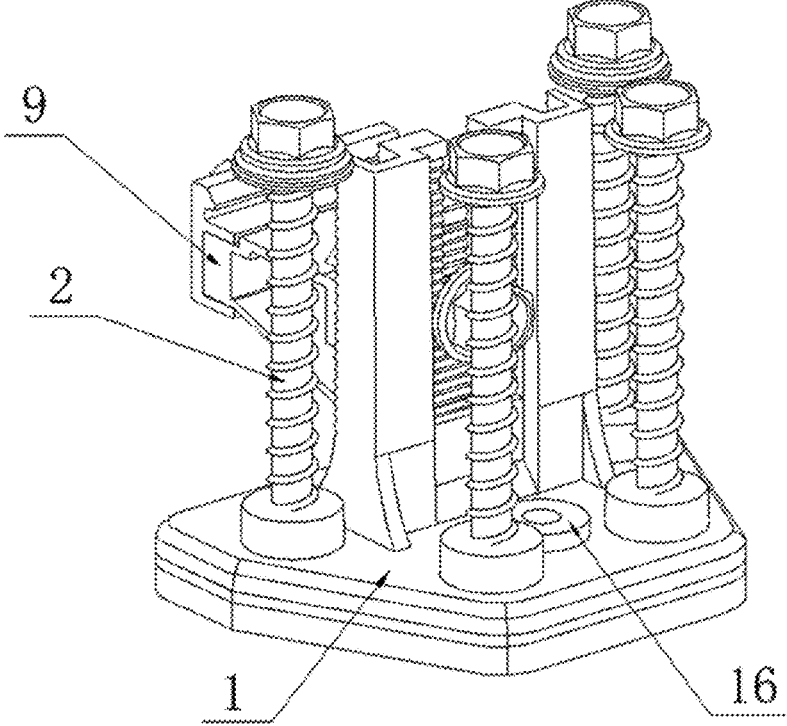
FIG. 2: Structural schematic diagram of the mounting base in the embodiment of the present invention.
Figure 3:
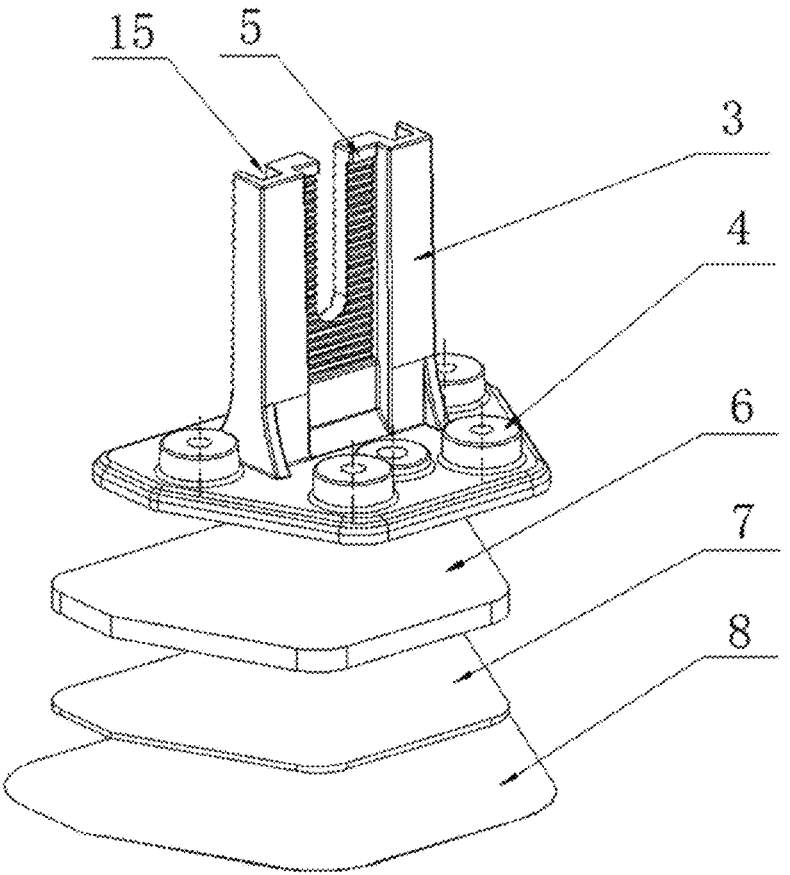
FIG. 3: Partial structural schematic diagram of the mounting base in the embodiment of the present invention.

As shown in FIGS. 1, 2, and 3, a solar PV rail mounting system is disclosed, comprising a mounting base, rails and rail mounting components, wind deflectors and wind deflector clamps, grounding wires and grounding wire connectors, inverters and inverter clamps, as well as mid clamps and end clamps for securing PV panels. The mounting base consists of an integrated base body, multiple mounting screws (2), and rail clamps (9). The base body includes a fixed base (1), which connects to the ground, and a mounting section (3) that attaches to the rail clamps (9). The fixed base (1) features multiple pre-installed screw sections (4), distributed around its perimeter, with pre-threaded holes matching the installation screws (2). Additionally, a spare screw installation hole (16) is provided at the center of the fixed base (1). The bottom of the fixed base (1) is sequentially layered with a foam rubber layer (6), a butyl rubber layer (7), and release paper (8).

The mounting section (3) is designed in a U-shape, allowing for vertical height adjustment via a bolt connection between the rail clamps (9) and the mounting section (3) through a U-slot mechanism. The mounting section (3) includes a rectangular positioning groove (15), while the clamp body (10) features a rectangular protrusion (14), ensuring secure positioning through matching engagement.

Additionally, anti-slip teeth are provided at the contact interface between the mounting section (3) and rail clamps (9). To further enhance stability, a retaining edge (5) is designed at the top of the mounting section (3) to prevent bolt slippage.

Figure 4:
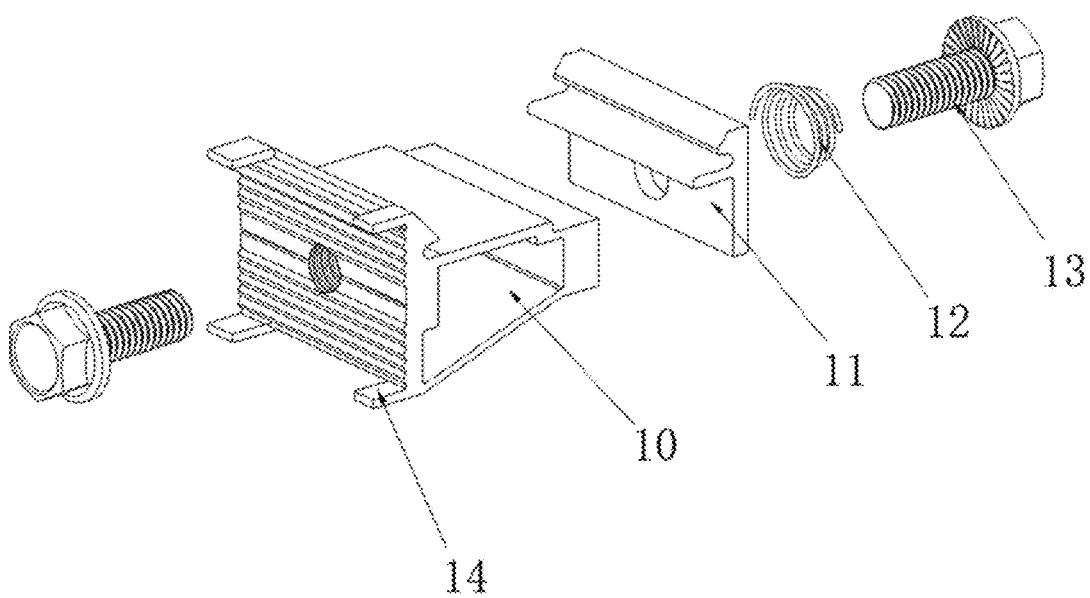
FIG. 4: Structural schematic diagram of the rail clamp in the embodiment of the present invention.

As shown in FIG. 4, the rail clamp (9) comprises a clamp body (10) and an adjustable section, which includes a movable block (11), a conical spring (12), and a flange bolt (13).

Installation Process

During installation, the release paper (8) is removed, and the fixed base (1) is pressed onto the pre-determined mounting location. Gentle, even pressure should be applied to ensure the butyl rubber layer (7) adheres firmly to the rooftop while avoiding any tilted placement of the fixed base (1).

The four mounting screws (2) are installed in a diagonal sequence, ensuring the applied torque is neither excessive nor insufficient to maintain proper alignment.

Figure 5:
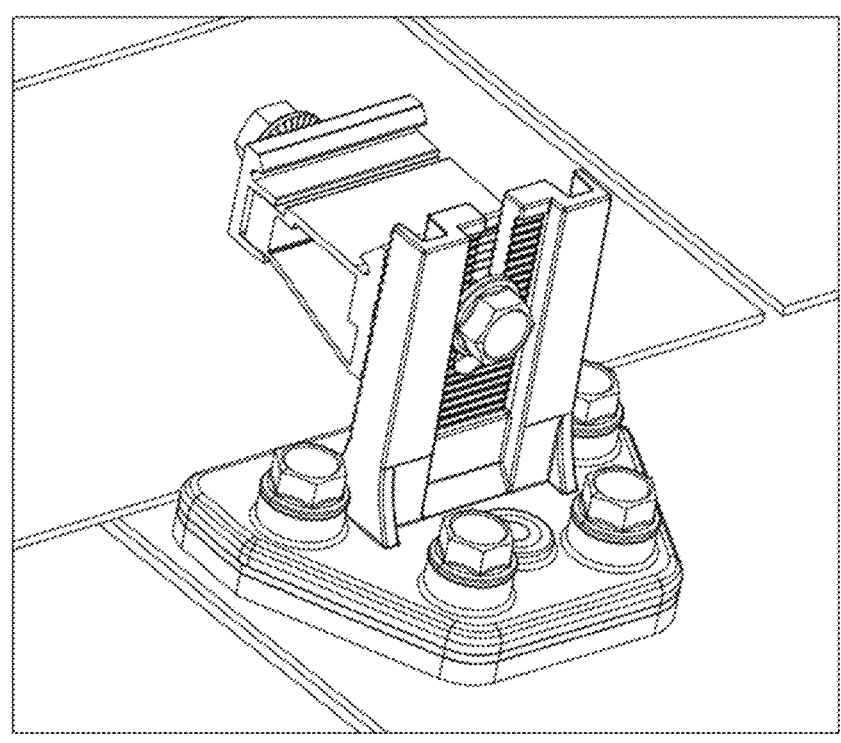
FIG. 5: Schematic diagram of the mounting base after installation in the embodiment of the present invention.

The rail clamp (9) is pre-assembled onto the U-shaped mounting section (3) and can be adjusted vertically based on the roof's evenness, as shown in FIG. 5.

Figure 6:
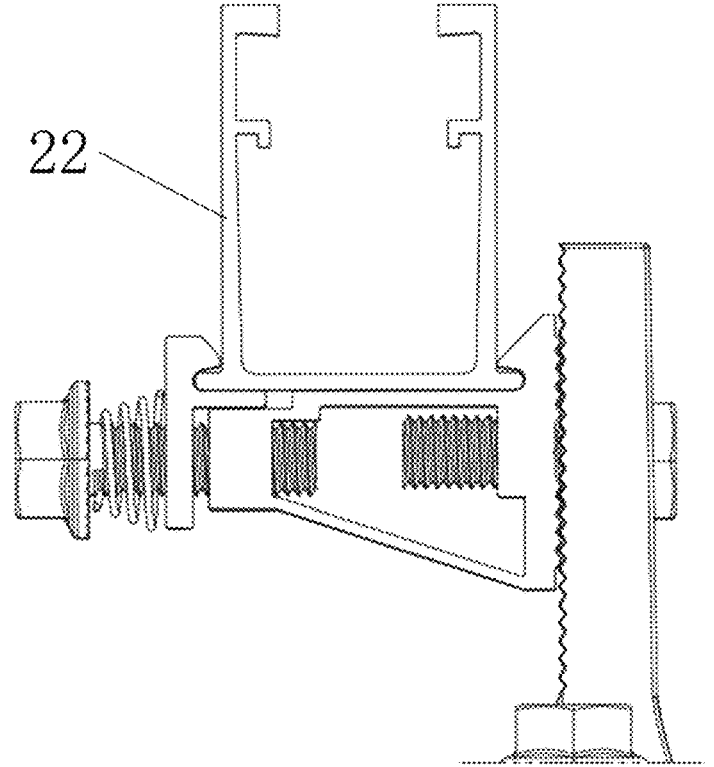
FIG. 6: Schematic diagram of the installation of the mounting base and rail in the embodiment of the present invention.

Once all mounting bases are installed, the rail clamps (9) are adjusted to the correct height for rail (22) installation. At this point, the rails (22) can be directly mounted (as illustrated in FIG. 6).

The adjustable section in the rail clamp (9) allows for a certain degree of flexibility during rail installation, ensuring convenient and rapid assembly.

Figure 7:
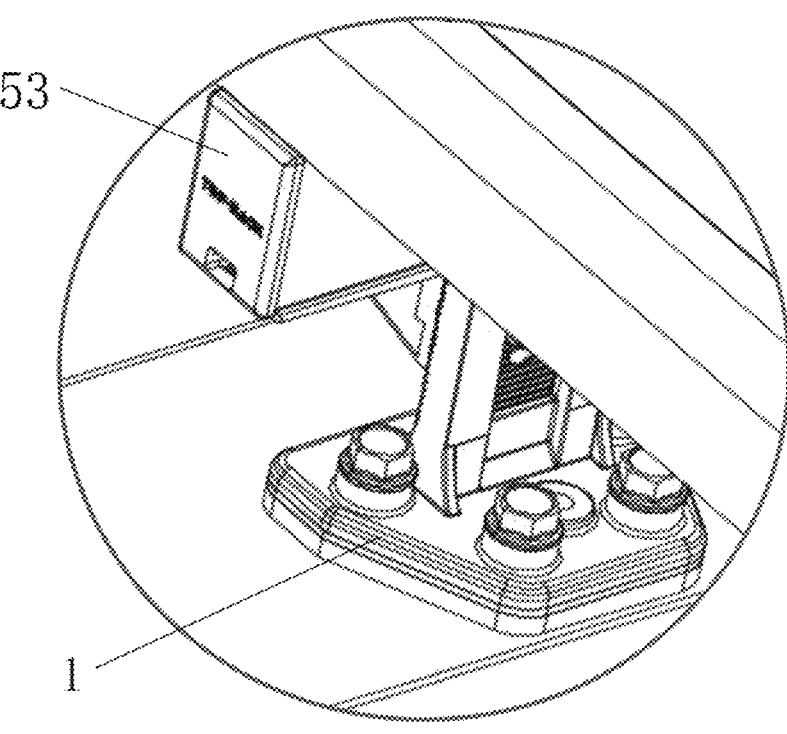
FIG. 7: Enlarged view of section A in FIG. 1 of the embodiment of the present invention.
Figure 8:
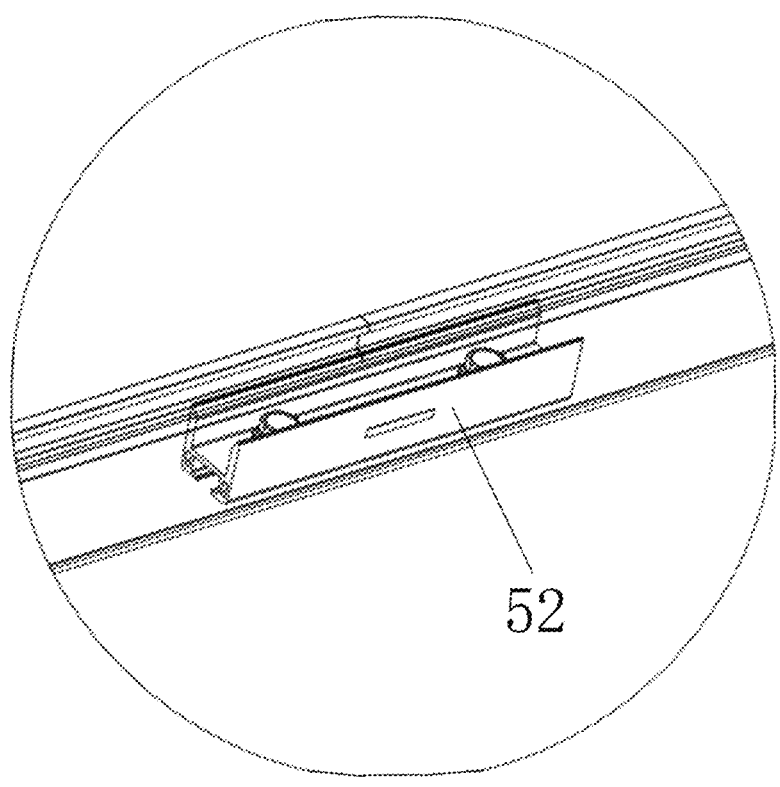
FIG. 8: Partial enlarged view of section B in FIG. 1 of the embodiment of the present invention.

Multiple rails (22) are connected using rail connectors (52) (as shown in FIG. 8), and rail end caps (53) are installed on the outermost rails (22) (as seen in FIG. 7). Additionally, inverters are mounted onto the rails (22) using inverter clamps.

Figure 9:
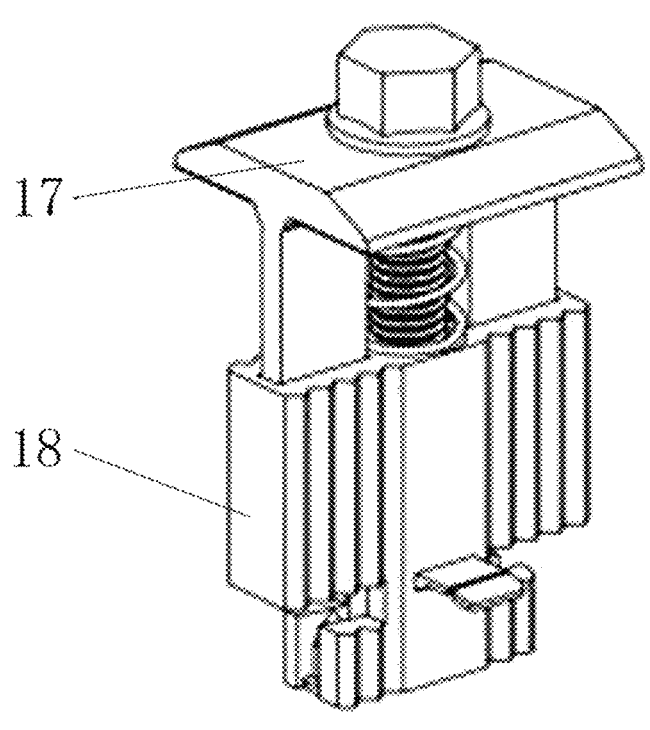
FIG. 9: Structural schematic diagram of the mid clamp in the embodiment of the present invention.
Figure 10:
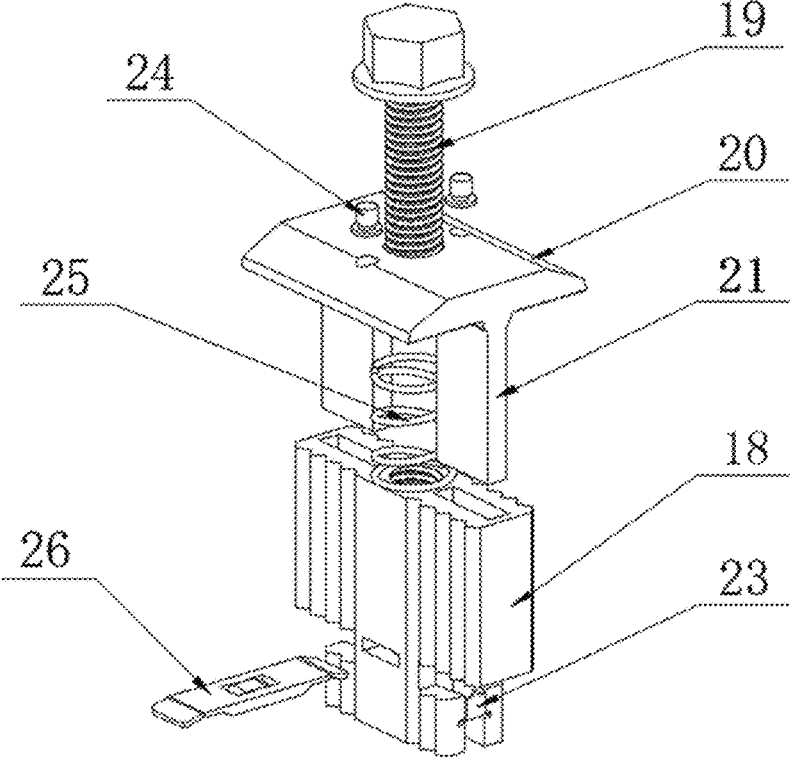
FIG. 10: Exploded schematic diagram of the mid clamp in the embodiment of the present invention.

As depicted in FIGS. 9 and 10, the mid clamp consists of an upper pressing block (17) and a fixed connecting block (18), connected via a sleeve-type mechanism. The upper pressing block (17) includes a PV panel upper press (20) and two sleeve rods (21), while the fixed connecting block (18) features matching sleeve slots. A spring (25) is positioned between the two sleeve rods (21) and secured by bolt III (19), allowing for elastic height adjustment during PV panel installation.

The fixed connecting block (18) also incorporates a supporting plate (26), which prevents the mid clamp from sinking into the rail (22) during installation. Both the upper pressing block (17) and the fixed connecting block (18) are equipped with grounding pins.

Figure 11:
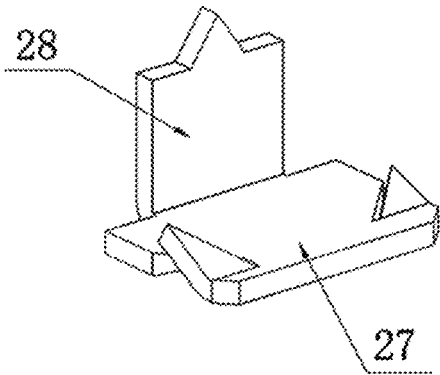
FIG. 11: Structural schematic diagram of Grounding Pin I in the embodiment of the present invention.

Grounding pin I (23), attached to the fixed connecting block (18), consists of a connecting section (27) and a piercing section (28) (as shown in FIG. 11). It is installed into a matching groove via press-fit fixation.

Grounding pin II (24) is positioned on both sides of the upper press (20) and is embedded into the PV module frame for electrical continuity.

Mid Clamp Installation Steps

Figure 12:
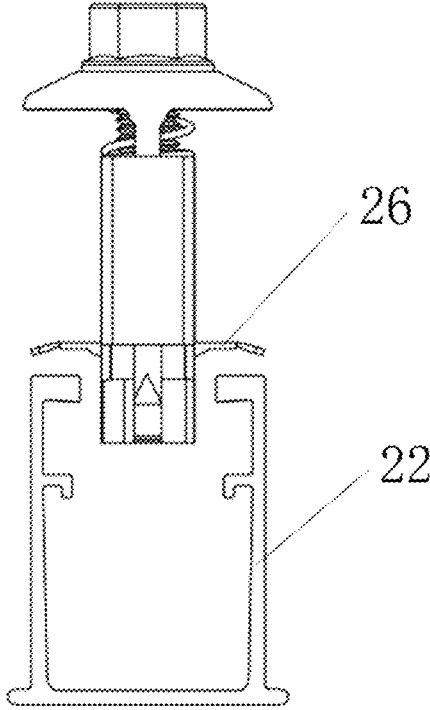
FIG. 12: First schematic diagram of mid clamp installation in the embodiment of the present invention.
Figure 13:
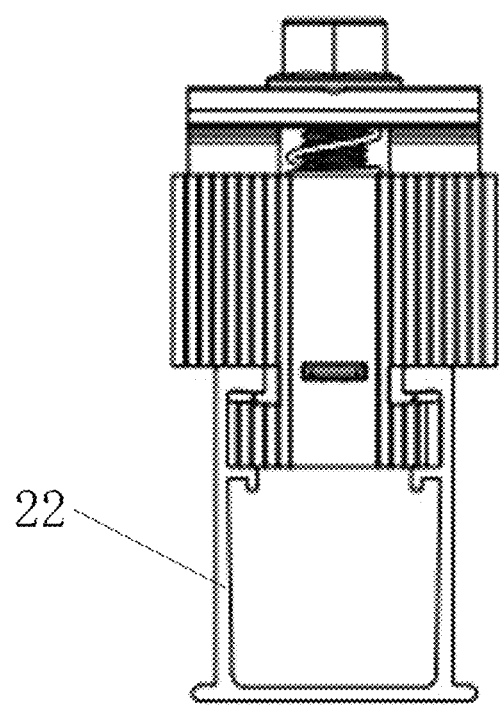
FIG. 13: Second schematic diagram of mid clamp installation in the embodiment of the present invention.
Figure 14:
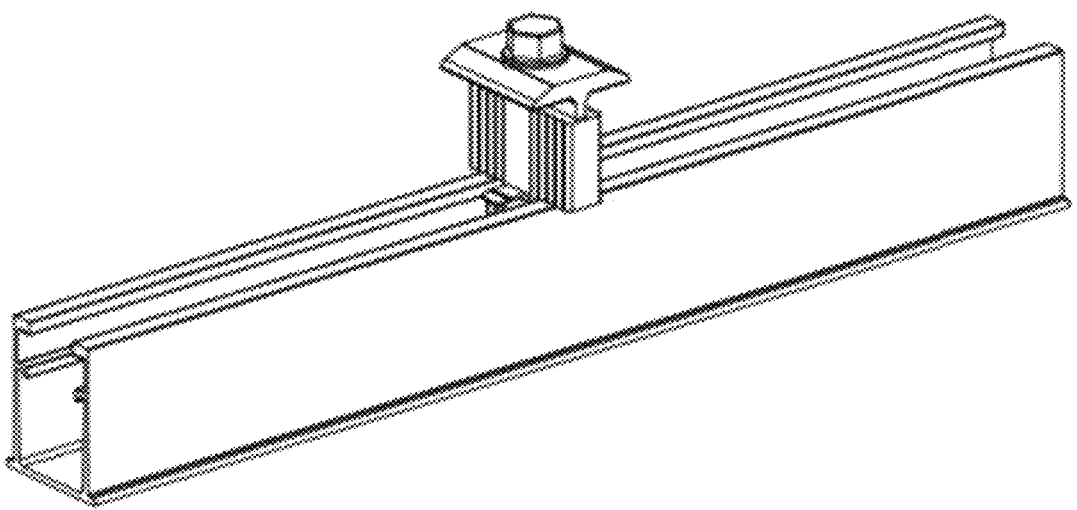
FIG. 14: Schematic diagram of the mid clamp after installation in the embodiment of the present invention.

1. As illustrated in FIG. 12, the mid clamp is inserted into the installation groove of the rail (22), while the supporting plate (26) prevents it from sinking.
2. The mid clamp is rotated 90 degrees and then fixed into place (as shown in FIG. 13), ensuring that the piercing section (28) of grounding pin I establishes electrical continuity with the rail (22).
3. Once installed, the mid clamp can still move within the installation groove (as depicted in FIG. 14).

7             8

Figure 15:
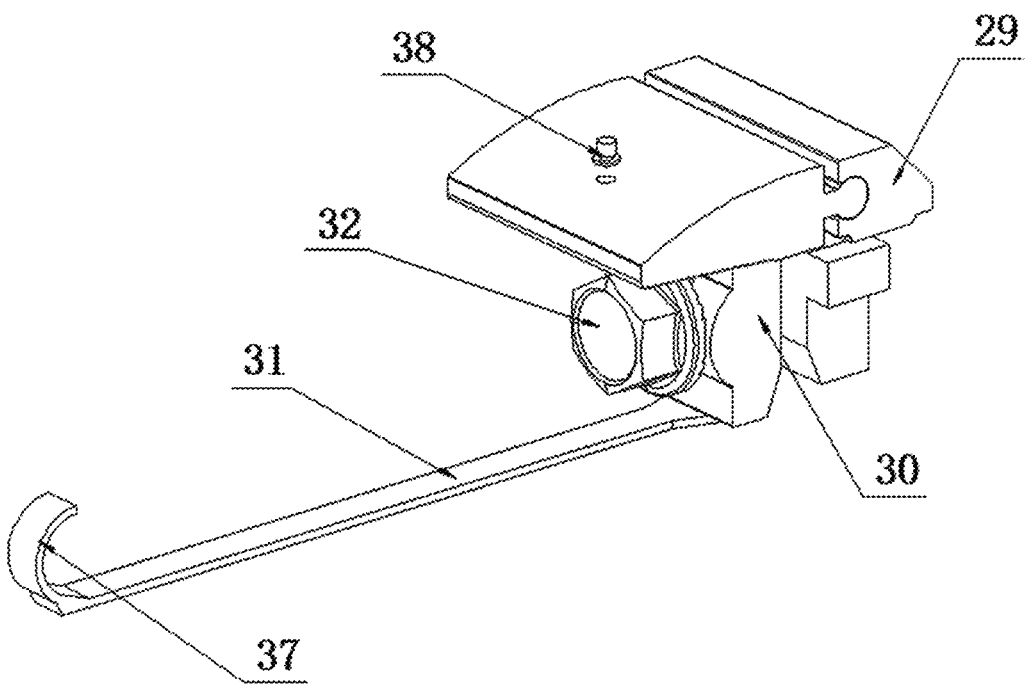
FIG. 15: Structural schematic diagram of the end clamp in the embodiment of the present invention.
Figure 16:
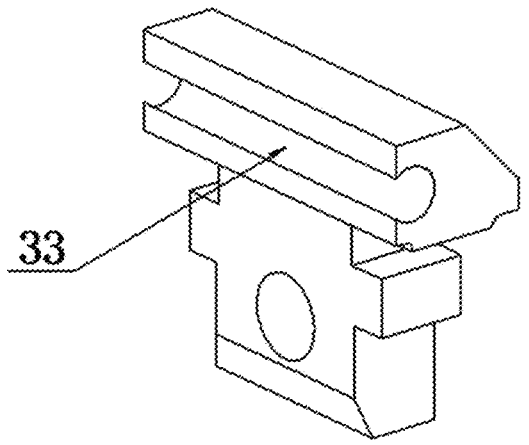
FIG. 16: Structural schematic diagram of the fixed section of the end clamp in the embodiment of the present invention.
Figure 17:
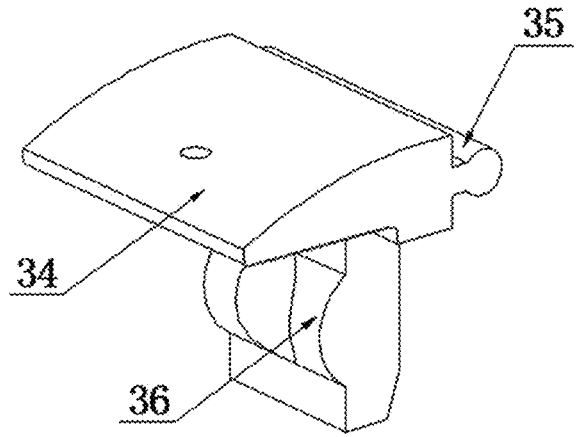
FIG. 17: Structural schematic diagram of the movable section of the end clamp in the embodiment of the present invention.

As shown in FIGS. 15-17, the end clamp consists of a fixed section (29), a movable section (30), and a tension wire (31).

The fixed section (29) includes an upper spherical connection slot (33) and a lower rail connection section.

The movable section (30) consists of a frame pressing plate (34) and a spherical protrusion (35) that fits into the spherical slot (33), forming a bearing-like structure.

The tension wire (31) features a pull ring that loops around bolt IV (32), allowing for quick height adjustment of the frame pressing plate (34).

Figure 18:
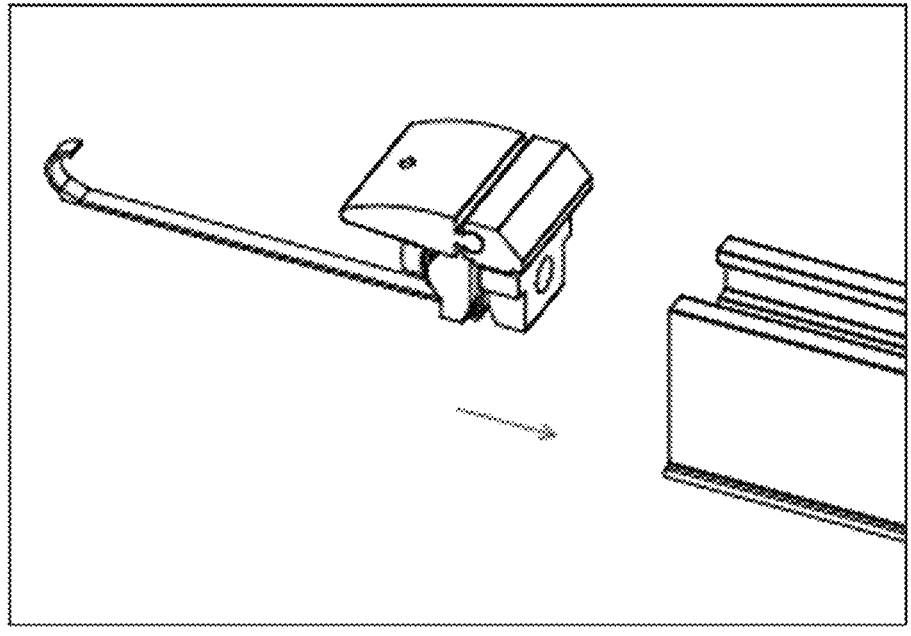
FIG. 18: First schematic diagram of end clamp installation in the embodiment of the present invention.
Figure 19:
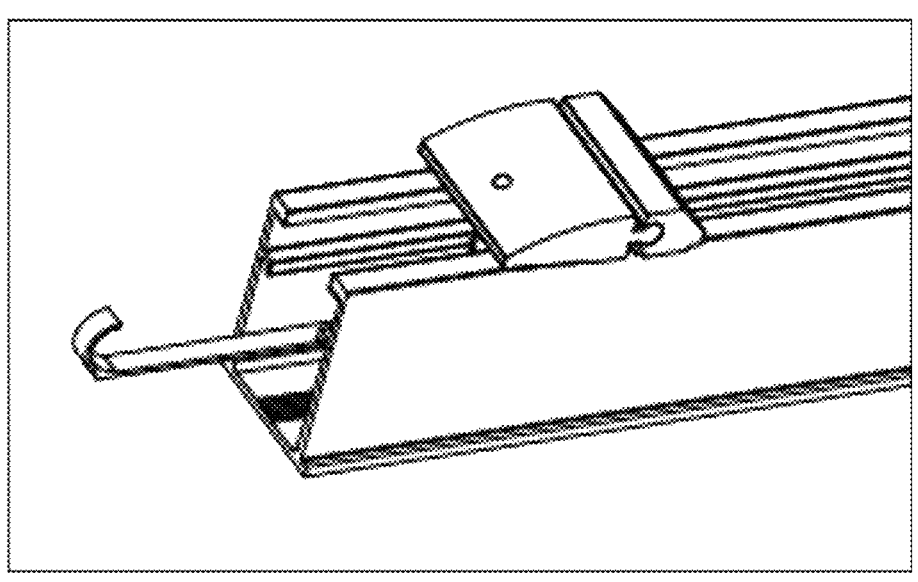
FIG. 19: Second schematic diagram of end clamp installation in the embodiment of the present invention.
Figure 20:
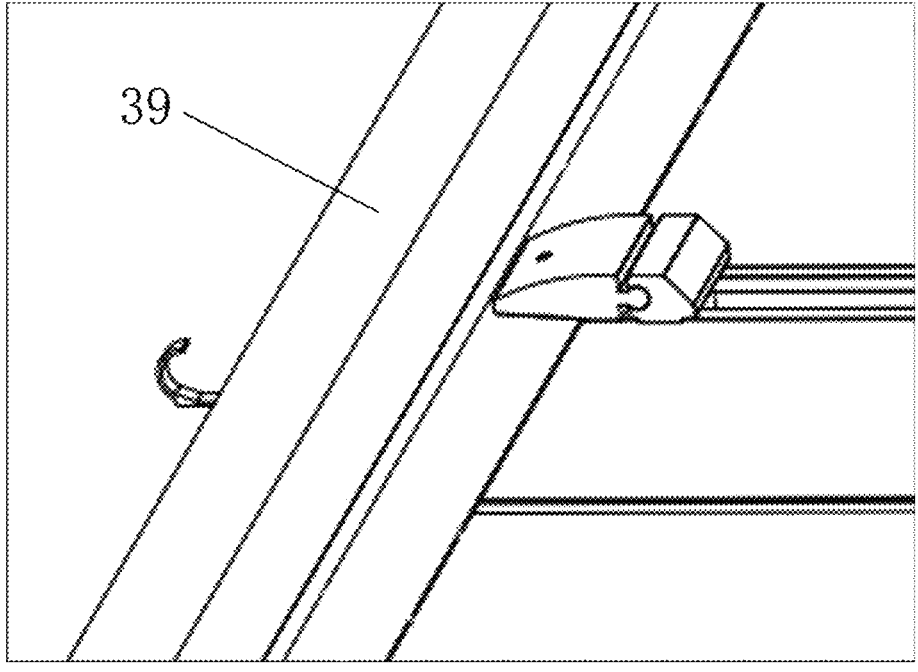
FIG. 20: Third schematic diagram of end clamp installation in the embodiment of the present invention.

During Installation:

1. Before tightening bolt IV (32), the tension wire (31) is pulled, enabling the frame pressing plate (34) to move freely.
2. As shown in FIG. 18, the rail connection section of the end clamp is inserted into the rail.
3. The PV panel frame (39) is placed into position (as seen in FIG. 19), and by pulling the tension wire (31), the frame pressing plate (34) secures the PV module.
4. Once bolt IV (32) is tightened, the installation is complete (FIG. 20), ensuring that grounding pin III (38) establishes continuity with the PV panel frame (39).

Figure 21:
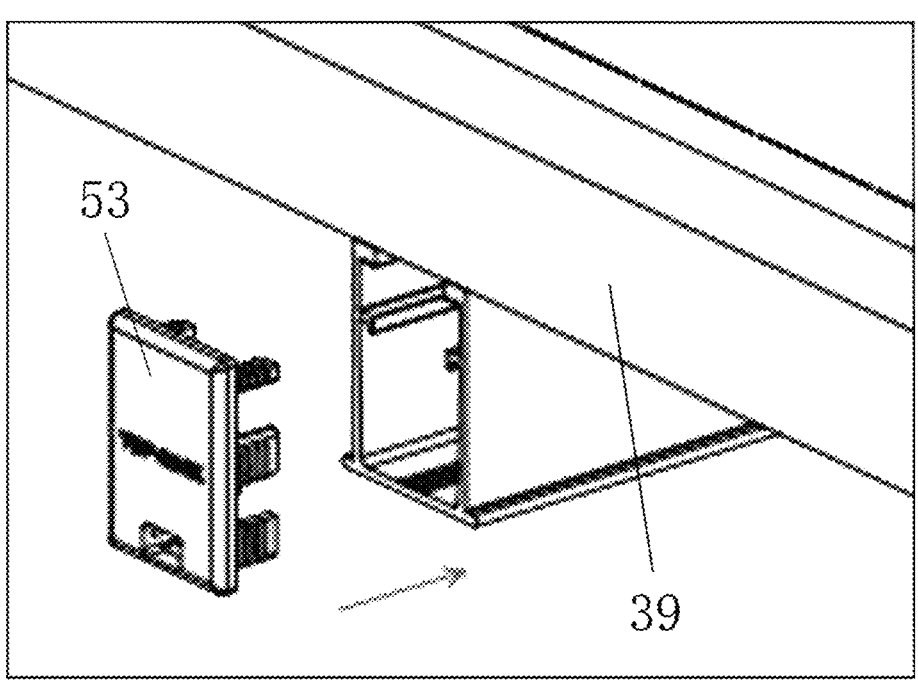
FIG. 21: Fourth schematic diagram of end clamp installation in the embodiment of the present invention.
Figure 22:
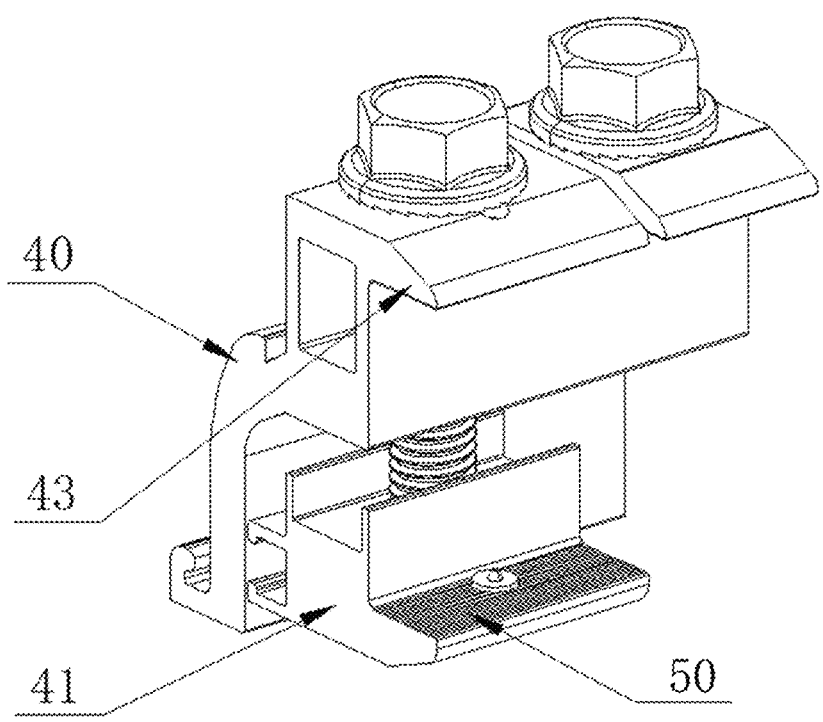
FIG. 22: Structural schematic diagram of the wind deflector clamp in the embodiment of the present invention.
Figure 23:
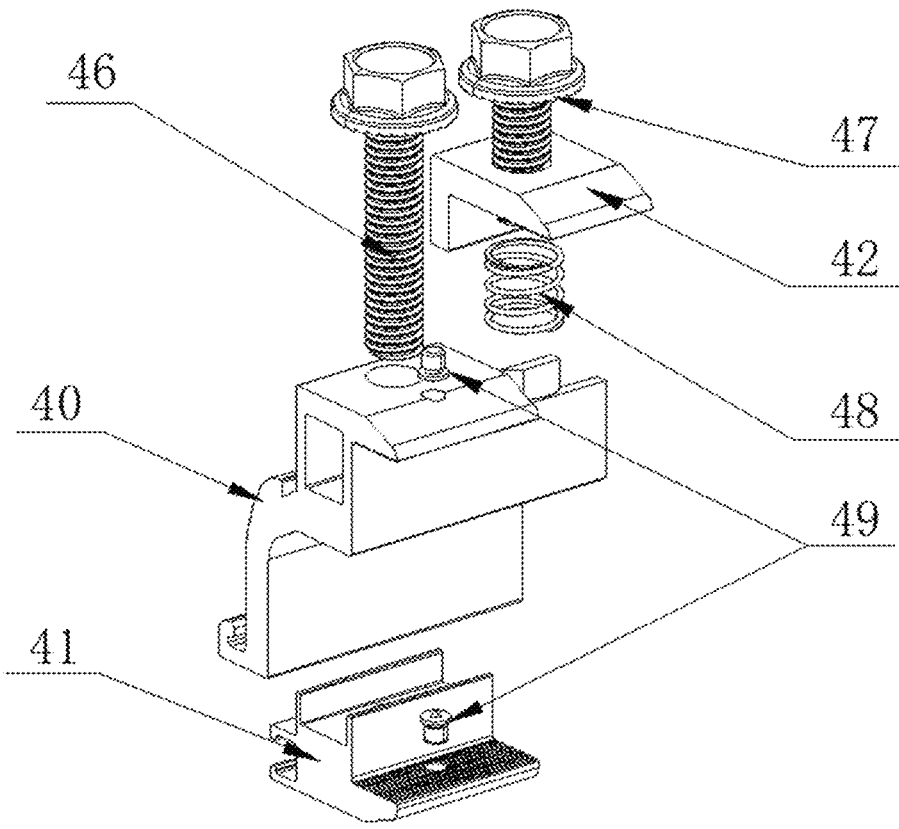
FIG. 23: Exploded structural schematic diagram of the wind deflector clamp in the embodiment of the present invention.
Figure 24:
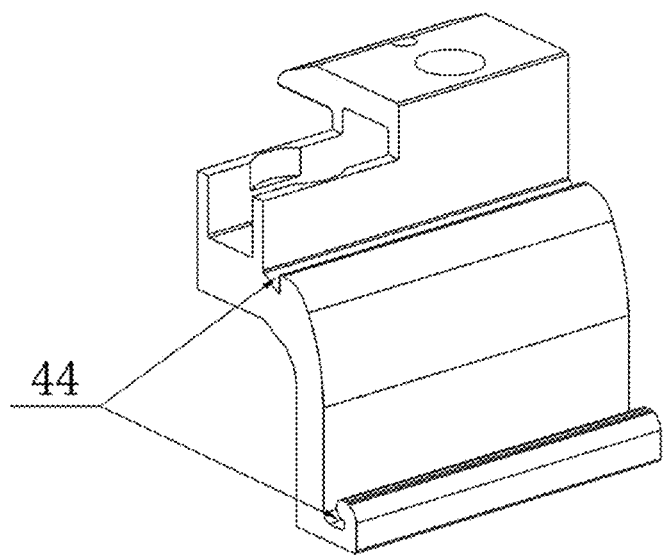
FIG. 24: Schematic diagram of the upper wind deflector fixing block in the embodiment of the present invention.
Figure 25:
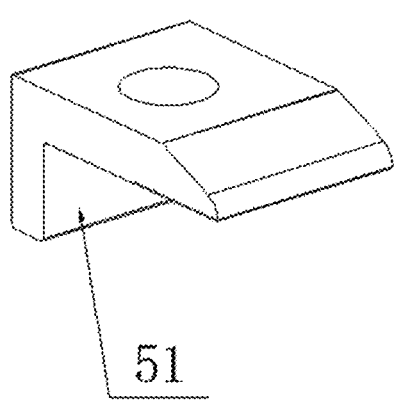
FIG. 25: Schematic diagram of the wind deflector pressing block in the embodiment of the present invention.
Figure 26:
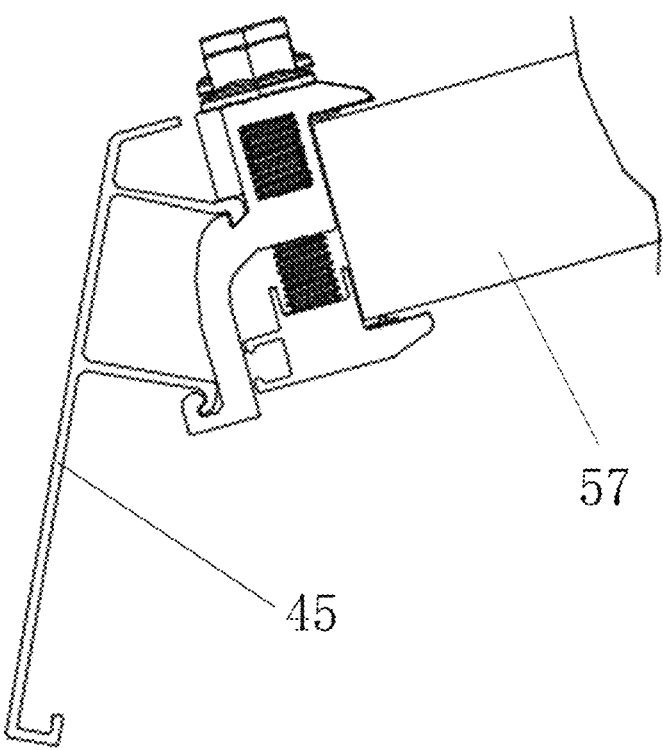
FIG. 26: Schematic diagram of wind deflector clamp installation in the embodiment of the present invention.
Figure 27:
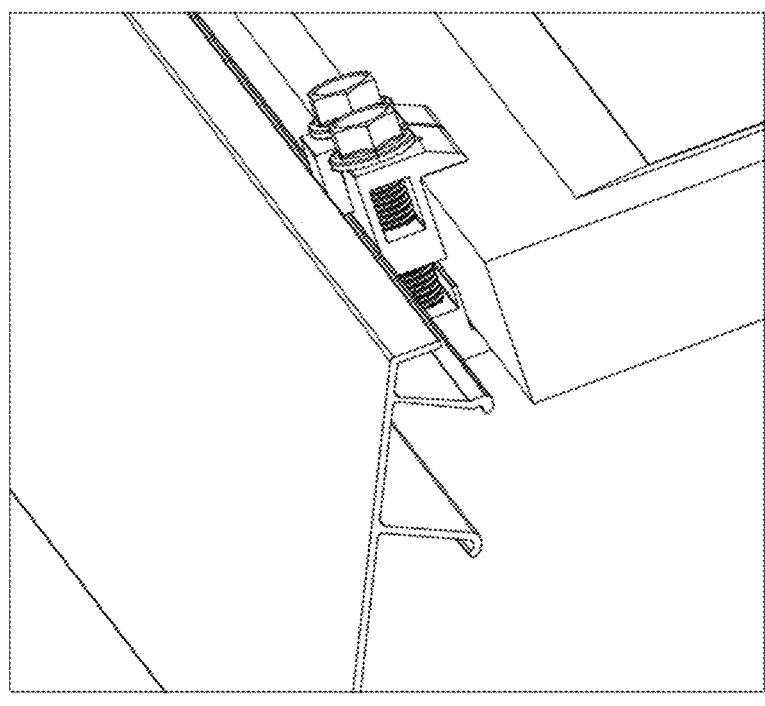
FIG. 27: Schematic diagram of the installed embodiment of the present invention.
Figure 28:
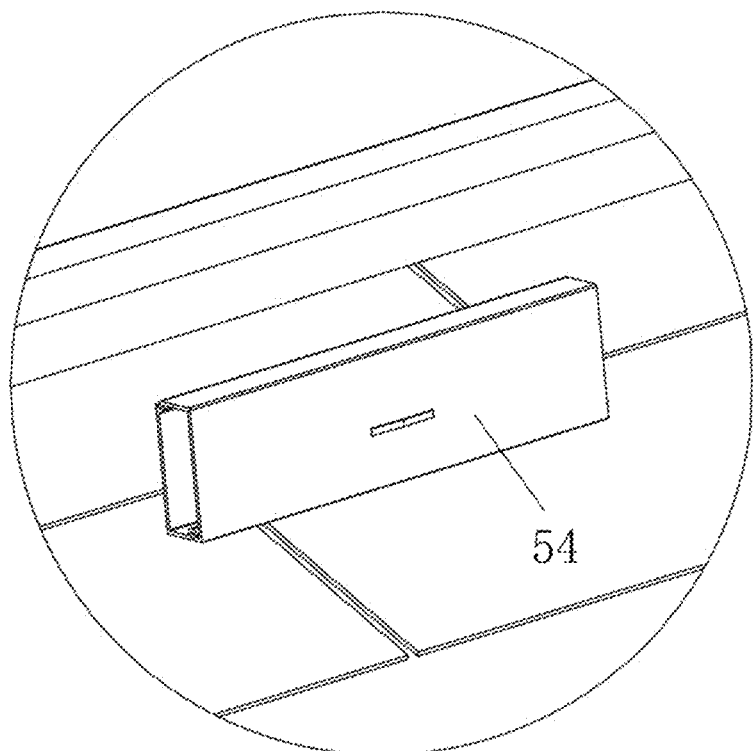
FIG. 28: Partial enlarged view of section D in FIG. 1 of the embodiment of the present invention.
Figure 29:
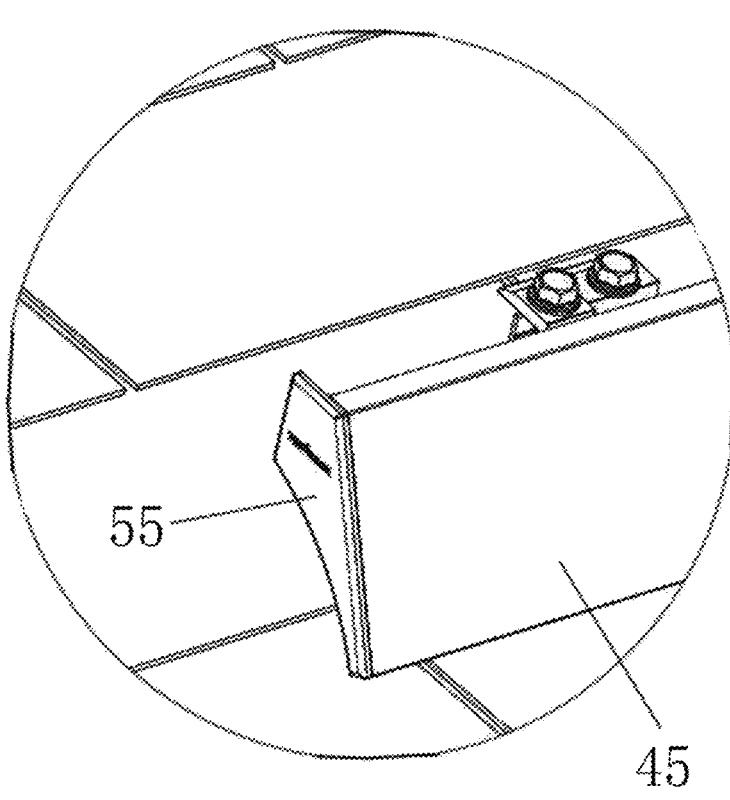
FIG. 29: Enlarged view of section C in FIG. 1 of the embodiment of the present invention.

After fixing the end clamp, the tension wire (31) is hidden within the rail, and a rail end cap (53) is installed (FIG. 21), resulting in a clean and aesthetically pleasing installation.

As depicted in FIGS. 22-25, the wind deflector clamp comprises:

An upper wind deflector fixture (40), a lower wind deflector fixture (41), and a wind deflector pressing block (42).

The upper wind deflector fixture (40) features an installation pressing plate (43) and a guide rail slot (44), allowing the wind deflector (45) to move horizontally once snapped in.

The wind deflector pressing block (42) is secured via bolt II (47), pressing against the wind deflector (45) for stability.

During installation (FIGS. 26-29), the solar PV panel frame (57) is placed between the upper and lower wind deflector fixtures (40, 41) and secured with bolt I (46). The wind deflector (45) is then locked into position, with anti-slip teeth (50) ensuring stability.

Figure 30:
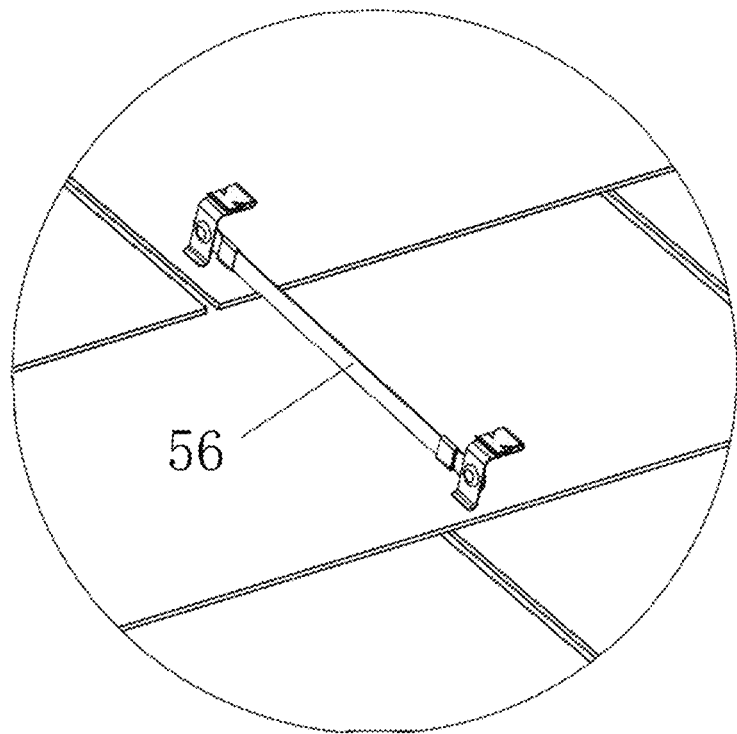

As shown in FIG. 30, a grounding wire (56) is attached to the rail using grounding clips and a wire cover, finalizing the installation.

It will be appreciated by persons skilled in the art that the present invention is not limited to what has been particularly shown and described. Rather, the scope of the present invention is defined by the claims which follow. It should further be understood that the above description is only representative of illustrative examples of embodiments. The description has not attempted to exhaustively enumerate all possible variations. The alternate embodiments may not have been presented for a specific portion of the invention, and may result from a different combination of described portions, or that other un-described alternate embodiments may be available for a portion, is not to be considered a disclaimer of those alternate embodiments. It will be appreciated that many of those un-described embodiments are within the literal scope of the following claims, and others are equivalent.

The invention claimed is:

1. A solar photovoltaic (PV) rail mounting system, comprising:

a mounting base comprising a fixed base (1) for connection to ground and a mounting section (3) connected to a rail clamp (9), wherein the fixed base (1) is equipped with multiple pre-installed screw sections (4) arranged around its perimeter, each containing threading matching installation screws (2);

a mid clamp consisting of an upper pressing block (17) and a fixed connecting block (18), wherein the upper pressing block and the fixed connecting block are connected via a sleeve-type connection; wherein the upper pressing block (17) includes a top PV panel press (20) and two sleeve rods (21), wherein the fixed connecting block (18) has sleeve slots matching the two sleeve rods (21), wherein a spring I (25) is positioned between the two sleeve rods (21) and secured by bolt III (19), providing an elastic height adjustment for PV panel installation, wherein both the upper pressing block (17) and the fixed connecting block (18) are equipped with grounding pins;

an end clamp comprising a fixed section (29), a movable section (30), and a tension wire (31), wherein the fixed section (29) includes an upper spherical connection slot (33) and a lower rail connection section, wherein the movable section (30) consists of a frame pressing plate (34) and a spherical protrusion (35) that is movably connected to the spherical connection slot (33), wherein the fixed section (29) and the movable section (30) are connected by bolt IV (32), with the tension wire (31) featuring a pull ring at the connection end that loops around bolt IV (32) for secure attachment;

a wind deflector clamp comprising an upper wind deflector fixture (40), a lower wind deflector fixture (41), and a wind deflector pressing block (42), wherein one side of the upper wind deflector fixture (40) is fitted with an installation pressing plate (43), and the other side features a strip-shaped guide rail slot (44) for snap-fit connection with the wind deflector (45), allowing for horizontal movement of the wind deflector (45) within the slot, wherein the upper wind deflector fixture (40) and the lower wind deflector fixture (41) are connected via an adjustable bolt I (46), forming an installation groove fixed to the solar PV panel frame, wherein the wind deflector pressing block (42) is attached to the upper wind deflector fixture (40) via bolt II (47), with one side flush with the installation pressing plate (43) and the other side equipped with a pressing strip (51) to secure the wind deflector (45).

2. The solar PV rail mounting system according to claim 1, wherein the rail clamp (9) comprises a clamp body (10) and an adjustable section, which includes a movable block (11), a conical spring (12), and a flange bolt (13), wherein the clamp body (10) is equipped with a protrusion (14) that fits into a positioning groove (15) on the mounting section (3) to achieve installation alignment.

3. The solar PV rail mounting system according to claim 1, wherein the mounting section (3) is U-shaped, and the rail clamp (9) is connected to the mounting section (3) via bolts, allowing for vertical height adjustment through the U-shaped slot, with the top of the mounting section (3) featuring a retaining edge (5) to prevent bolt slippage.

4. The solar PV rail mounting system according to claim 1, wherein the bottom of the fixed base (1) is sequentially layered with a foam rubber layer (6), a butyl rubber layer (7), and release paper (8).

5. The solar PV rail mounting system according to claim 1, wherein the fixed connecting block (18) contains a supporting plate (26).

6. The solar PV rail mounting system according to claim 1, wherein the grounding pin I (23) on the fixed connecting block (18) comprises a connecting section (27) and a piercing section (28), and the fixed connecting block (18) is equipped with an installation groove matching the connecting section (27), using press-in fixation, wherein the grounding pin II (24) on the upper pressing block (17) is embedded on both sides of the top PV panel press (20).

7. The solar PV rail mounting system according to claim 1, wherein the movable section (30) is equipped with an arc-shaped protrusion (36) at connection point with the bolt IV (32).

8. The solar PV rail mounting system according to claim 1, wherein the tension wire (31) is made of soft plastic, with a semi-circular pull hook (37) at the pull end designed to match the shape of a finger for easy operation.

9. The solar PV rail mounting system according to claim 1, wherein a spring II (48) is positioned between the upper wind deflector fixture (40) and the wind deflector pressing block (42), with spring II (48) looped around bolt II (47) to enable elastic connection.

10. The solar PV rail mounting system according to claim 1, wherein the contact surfaces between the upper wind deflector fixture (40), the lower wind deflector fixture (41), and the solar PV panel frame are equipped with anti-slip teeth (50).

\*    \*    \*    \*    \*